US012680611B2

(12) United States Patent
Nagai et al.

(10) Patent No.: US 12,680,611 B2
(45) Date of Patent: Jul. 14, 2026

(54) WORK VEHICLE

(71) Applicant: KUBOTA CORPORATION, Osaka (JP)

(72) Inventors: Hiroaki Nagai, Sakai (JP); Daisuke Nakayama, Sakai (JP); Hironobu Nogami, Sakai (JP); Ryo Masuda, Sakai (JP); Keiji Takahashi, Sakai (JP); Tatsuya Sakai, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/664,345

(22) Filed: May 15, 2024

(65) Prior Publication Data

US 2024/0295265 A1     Sep. 5, 2024

Related U.S. Application Data

(63) Continuation of application No. PCT/JP2022/046884, filed on Dec. 20, 2022.

(30) Foreign Application Priority Data

Dec. 24, 2021     (JP) ................................. 2021-211674

(51) Int. Cl.
   *F16H 63/06*          (2006.01)
   *B62D 49/06*          (2006.01)
   (Continued)

(52) U.S. Cl.
   CPC .......... *F16H 63/062* (2013.01); *B62D 49/06* (2013.01); *F16H 61/32* (2013.01); *F16H 61/435* (2013.01);
   (Continued)

(58) Field of Classification Search
   CPC ...... F16H 63/062; F16H 61/35; F16H 61/435; F16H 61/439; B62D 49/06; B60Y 2200/221
   See application file for complete search history.

(56) References Cited

U.S. PATENT DOCUMENTS 6,321,612 B1 * 11/2001 Leimbach ............... F16H 61/32
                                                          74/473.1
6,470,764 B1 * 10/2002 Yamaguchi ............. F16H 61/32
                                                          74/335
(Continued)

FOREIGN PATENT DOCUMENTS

FR        1431758 A      3/1966
JP        10-054461 A    2/1998
(Continued)

OTHER PUBLICATIONS

Official Communication issued in International Patent Application No. PCT/JP2022/046884, mailed on Mar. 7, 2023.
(Continued)

*Primary Examiner* — Dustin T Nguyen
(74) *Attorney, Agent, or Firm* — Keating & Bennett, LLP

(57)          ABSTRACT

A work vehicle includes a hydrostatic continuously variable transmission to output power, an electric motor to perform shifting, a linkage mechanism to link a shifting shaft of the electric motor with a trunnion shaft of the hydrostatic continuously variable transmission the linkage mechanism, including a first linkage section linked with the shifting shaft, and a second linkage section linked with the trunnion shaft, and a biasing mechanism to press and bias a second gear of the second linkage section that meshes with a first gear of the first linkage section against the first gear such that a tooth flank of the second gear abuts with a tooth flank of the first gear in a rotation direction reverse to a rotation direction of the first gear.

10 Claims, 6 Drawing Sheets

(51) Int. Cl.
    *F16H 61/32*         (2006.01)
    *F16H 61/435*      (2010.01)
    *F16H 61/439*      (2010.01)

(52) U.S. Cl.
    CPC ....... *B60Y 2200/221* (2013.01); *F16H 61/439*
                              (2013.01)

(56)            References Cited

U.S. PATENT DOCUMENTS 7,165,398 B1 *   1/2007   Holder .................. F16H 61/435
                                          60/487
8,573,089 B2 *  11/2013  Nishino ................ F16H 61/437
                                          74/567

FOREIGN PATENT DOCUMENTS

JP           H1054461  A     2/1998
JP       2009-150414  A     7/2009

OTHER PUBLICATIONS

Official Communication issued in corresponding European Patent Application No. 22911225.5, mailed on Nov. 24, 2025, 8 pages.

* cited by examiner

Fig.7

WORK VEHICLE

CROSS REFERENCE TO RELATED APPLICATIONS

This application claims the benefit of priority to Japanese Patent Application No. 2021-211674 filed on Dec. 24, 2021 and is a Continuation Application of PCT Application No. PCT/JP2022/046884 filed on Dec. 20, 2022. The entire contents of each application are hereby incorporated herein by reference.

BACKGROUND OF THE INVENTION

1. Field of the Invention

The present invention relates to work vehicles each including a hydrostatic continuously variable transmission including a trunnion shaft controlled to shift by an electric motor.

2. Description of the Related Art

This type of work vehicle may be configured such that a driven gear section provided in a relay crank lever is meshed with a drive gear provided in an output section of an electric motor so that a trunnion shaft of a hydrostatic continuously variable transmission is operated in forward and reverse directions in response to an output from the electric motor (see, for example, Japanese Unexamined Patent Application Publication No. 2009-150414).

SUMMARY OF THE INVENTION

The configuration in which the trunnion shaft is operated in response to the output from the electric motor like the related art described in Japanese Unexamined Patent Application Publication No. 2009-150414 is advantageous in that leakage of pressure oil or the like is less likely to cause instability in an operation position in comparison with a configuration in which the trunnion shaft is operated by use of a hydraulic actuator, for example.

However, in a case where the electric motor is used, there is a problem such as instability in position due to backlash at a gear meshing portion used to decelerate an operational speed or the occurrence of chattering depending on the sensitivity of feedback, and there is room for improvement in such a point. In a case where a gear having a special structure such as a double-gear structure is used to avoid the occurrence of backlash at such a gear meshing portion, for example, there is such a problem that adjustment is troublesome at the time of disassembling or the structure is complicated.

Example embodiments of the present invention provide work vehicles that each enable a stable shifting operation while the occurrence of backlash at a gear meshing portion provided in an operation system from an electric motor to a trunnion shaft of a hydrostatic continuously variable transmission is reduced or prevented with a simple structure.

A work vehicle according to an example embodiment of the present invention includes a hydrostatic continuously variable transmission to output power, an electric motor to perform shifting, a linkage mechanism to link a shifting shaft of the electric motor with a trunnion shaft of the hydrostatic continuously variable transmission, the linkage mechanism including a first linkage section linked with the shifting shaft, and a second linkage section linked with the trunnion shaft, and a biasing mechanism to press and bias a second gear of the second linkage section, which meshes with a first gear of the first linkage section, against the first gear such that a tooth flank of the second gear abuts with a tooth flank of the first gear in a rotation direction reverse to a rotation direction of the first gear.

In an example embodiment of the present invention, the linkage mechanism to link the shifting shaft of the electric motor with the trunnion shaft of the hydrostatic continuously variable transmission includes the first gear and the second gear, and the biasing mechanism is provided between the first gear and the second gear such that the biasing mechanism biases the second gear against the first gear to bring their tooth flanks into contact with each other.

Accordingly, an example embodiment of the present invention achieves an advantage such that a shifting operation can be performed on the first gear and the second gear with their tooth flanks always abutting with each other, without a complicated structure such as a two-ply gear driving mechanism, and an operation from the shifting shaft of the electric motor to the trunnion shaft of the hydrostatic continuously variable transmission can be performed stably.

In an example embodiment of the present invention, it is preferable that the biasing mechanism includes a swing arm swingable together with the trunnion shaft, and an operation body swingable around an axial center parallel or substantially parallel to an axial center of the trunnion shaft, the swing arm includes a cam, the operation body includes a cam follower, the biasing mechanism further includes a biasing spring configured to bias the cam follower toward the cam, and the swing arm is swingable in a swinging direction causing the tooth flank of the second gear to approach the tooth flank of the first gear, in response to the biasing spring and the cam follower pressing the cam.

With this configuration, the biasing mechanism can be configured with such a simple structure in which the biasing mechanism just includes the swing arm swingable together with the trunnion shaft, the operation body being swingable around the axial center parallel or substantially parallel to the axial center of the trunnion shaft, and the biasing spring is operable to bias the cam follower of the operation body toward the cam of the swing arm.

In an example embodiment of the present invention, it is preferable that the second gear and the cam be provided in the swing arm, at different positions in an axial-center direction of the trunnion shaft.

In this configuration, both the second gear and the cam are provided or integrated in the swing arm itself, so that the number of components can be made small and a planar area for disposition can be made small.

In an example embodiment of the present invention, it is preferable that the operation body include a swing fulcrum in an interval between a line segment passing through the axial center of the trunnion shaft and a line segment passing through an axial center of the shifting shaft in a direction perpendicular to a virtual line segment connecting the trunnion shaft to the shifting shaft.

With this configuration, the cam follower of the operation arm and the cam of the swing arm can work effectively, and the biasing mechanism can be easily disposed collectively and compactly.

In an example embodiment of the present invention, it is preferable that the hydrostatic continuously variable transmission includes an external wall to which a casing housing the linkage mechanism and the biasing mechanism is attached.

With this configuration, the external wall of the hydrostatic continuously variable transmission can be used as a fastener or fixer for the casing housing the linkage mechanism and the biasing mechanism.

In an example embodiment of the present invention, it is preferable that the electric motor be supported on an outer portion of the casing.

With this configuration, the casing housing the linkage mechanism and the biasing mechanism is used as support for the electric motor so as to easily achieve simplification of the structure.

In an example embodiment of the present invention, it is preferable that the work vehicle further includes a sensor supported on the casing to detect a swashplate angle of the hydrostatic continuously variable transmission.

With this configuration, the casing can be used as support for the sensor.

In an example embodiment of the present invention, it is preferable that the biasing mechanism includes an operation body swingable around an axial center parallel or substantially parallel to an axial center of the trunnion shaft, and a biasing spring to bias a cam follower of the operation body toward a cam of a swing arm swingable together with the trunnion shaft, and the biasing spring includes a torsion spring wound on a shaft supporting the operation body and housed in the casing.

With this configuration, when a torsion spring wound on the shaft supporting the operation body and housed in the casing is used as the biasing spring, the structure of the biasing mechanism can be made relatively compact and easily simplified.

In an example embodiment of the present invention, it is preferable that the torsion spring includes an end portion supported on the casing to receive a reaction force acting on the cam follower.

With this configuration, the casing can be used to receive the reaction force from the torsion spring, so that simplification of the structure can be achieved.

In an example embodiment of the present invention, it is preferable that the hydrostatic continuously variable transmission include a pump as a main transmission mechanism for a tractor, and the trunnion shaft be operable to change a swashplate angle of the pump.

With this configuration, the pump of the hydrostatic continuously variable transmission can be used as the main transmission mechanism of the tractor.

In an example embodiment of the present invention, it is preferable that the hydrostatic continuously variable transmission include a motor as a secondary transmission mechanism for the tractor.

With this configuration, the motor of the hydrostatic continuously variable transmission can be used as the secondary transmission mechanism of the tractor.

The above and other elements, features, steps, characteristics and advantages of the present invention will become more apparent from the following detailed description of the example embodiments with reference to the attached drawings.

BRIEF DESCRIPTION OF THE DRAWINGS

FIG. 7 is a side view illustrating the neutral biasing device with the trunnion shaft being operated to a highest speed position on a reverse side.

DETAILED DESCRIPTION OF THE EXAMPLE EMBODIMENTS

Examples of example embodiments of work vehicles of the present invention will be hereinafter described with reference to the drawings.

Note that a front-rear direction and a right-left direction in the description of the present example embodiment are described as follows unless otherwise described. That is, at the time when a work vehicle to which an example embodiment of the present invention is applied travels to work, an advancing direction to a forward side (see an arrow F in FIG. 1) indicates "front," an advancing direction to a reverse side (see an arrow B in FIG. 1) indicates "rear," a direction (see an arrow R in FIG. 3) corresponding to the right side based on the work vehicle facing forward in the front-rear direction indicates "right," and a direction (see an arrow L in FIG. 3) corresponding to the left side in the same state indicates "left."

Figure 1:
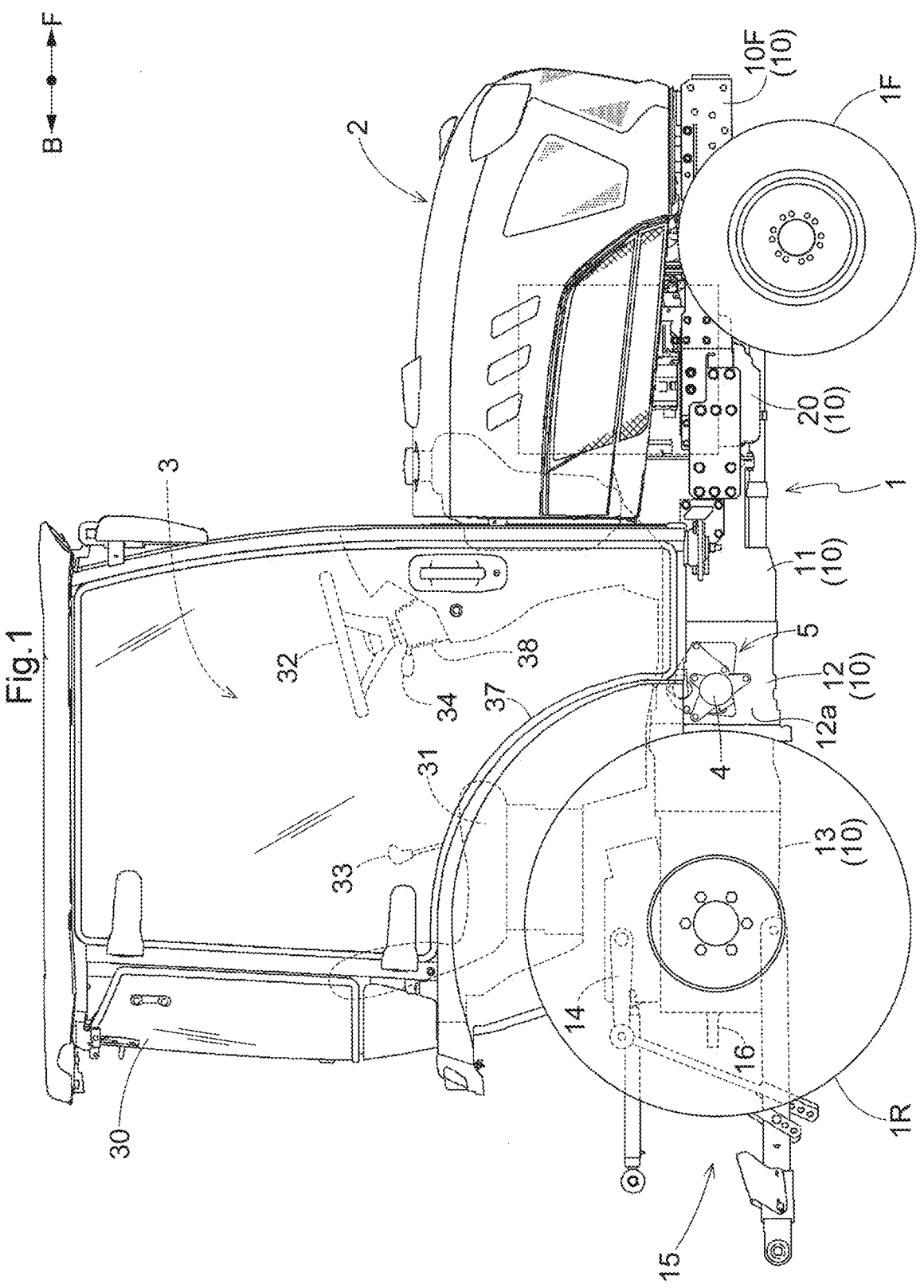
FIG. 1 is a side view illustrating the entire structure of a tractor.

FIG. 1 is a side view illustrating the whole tractor as an example of a work vehicle including a hydrostatic continuously variable transmission 12 according to the present example embodiment of the present invention. As illustrated in this figure, the tractor includes a vehicle body 1 including right and left front wheels 1F provided steerably and drivably and right and left rear wheels 1R provided drivably. The vehicle body 1 includes a motor section 2 in the front of the vehicle body 1 and a driving section 3 equipped with a drive cabin 30 in the rear of the vehicle body 1. The vehicle body 1 includes a vehicle body frame 10 via which the front wheels 1F and the rear wheels 1R support the motor section 2 and the driving section 3.

The vehicle body frame 10 has a monocoque structure including an engine mount frame 10F supported by the front wheels 1F, an engine 20 included in the motor section 2, a power transmission case 11 having a front end portion connected to the rear of the engine 20, a hydrostatic continuously variable transmission 12 having a front end portion connected to a rear end portion of the power transmission case 11, and a transmission case 13 having a front end portion connected to a rear end portion of the hydrostatic continuously variable transmission 12.

The transmission case 13 is supported by the rear wheels 1R. The rear of the transmission case 13 includes a link mechanism 15 including a pair of right and left lift arms 14 provided such that the lift arms 14 are swingable to lift and lower, and a power takeoff shaft 16 provided at the rear of the vehicle body frame 10.

The tractor is configured such that a work device such as a rotary cultivating device (not illustrated) is connectable to the rear of the vehicle body via the link mechanism 15 in such a manner as to be liftable and lowerable, for example, and a driving force is transmittable to the connected rotary cultivating device from the power takeoff shaft 16.

The drive cabin 30 of the driving section 3 includes a driver seat 31, a steering wheel 32 as a steerage operation tool, and various operation tools such as a main select lever 33 as a gear shift tool and a shuttle lever 34 as a forward and rearward gear shift tool.

The main select lever 33 is disposed on a front surface of a left rear-wheel fender 37 out of right and left rear-wheel fenders 37, so that the main select lever 33 is operable by a driver sitting in the driver seat 31. The shuttle lever 34 is provided on the left side of a steering column 38 to which the steering wheel 32 is attached, so that the shuttle lever 34 is operable by the left hand of the driver sitting in the driver seat 31.

The hydrostatic continuously variable transmission 12 to which the power from the engine 20 is transmitted includes an axial-plunger hydraulic pump (not illustrated) and a hydraulic motor (not illustrated). When the swashplate angle (not illustrated) of the hydraulic pump is adjusted to change, the rotation speed of an output shaft (not illustrated), output from the hydraulic motor (not illustrated), is varied. The power from the output shaft is thus varied and transmitted to the transmission case 13.

The swashplate angle of the hydraulic pump is changed by performing a rotation operation in forward and reverse directions on a trunnion shaft 12b projecting laterally outwardly from an external wall 12a of the hydrostatic continuously variable transmission 12. The rotation operation on the trunnion shaft 12b is performed by an electric motor 4 rotatable in forward and reverse directions and serving as an electric actuator provided outside the hydrostatic continuously variable transmission 12.

Figure 2:
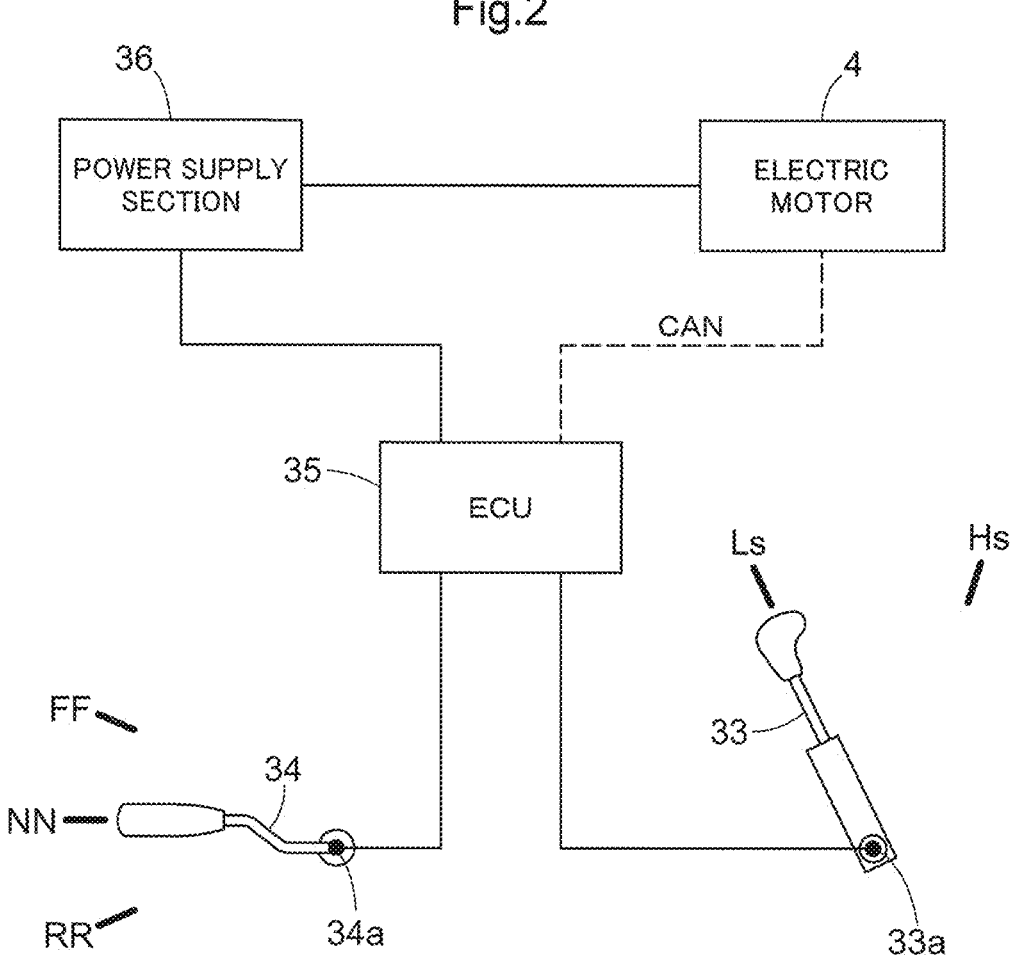
FIG. 2 is a block diagram illustrating a control circuit for a shifting operation system.

As illustrated in FIG. 2, respective operations of the main select lever 33 and the shuttle lever 34 are detected based on a detection signal from a volume (variable resistor) 33a provided at a swing fulcrum of the main select lever 33 and a detection signal from a volume (variable resistor) 34a provided at a swing fulcrum of the shuttle lever 34, and their detection results are input into an ECU (electronic control unit) 35.

The ECU 35 is connected to a power supply section 36, so that electric power for control is supplied from the power supply section 36. A control signal from the ECU 35 is transmitted to the electric motor 4 by CAN communication. Electric power for drive from the power supply section 36 is supplied to the electric motor 4, and the trunnion shaft 12b is rotated in the forward or reverse direction based on the control signal from the ECU 35, so that the swashplate angle of the hydrostatic continuously variable transmission 12 is changed.

The main select lever 33 is variable continuously to a given shift position between a lowest speed position Ls as zero speed and a highest speed position Hs. The operation position of the main select lever 33 is detected by the volume 33a of the main select lever 33, and the detection signal is input into the ECU 35 as an instructed speed signal.

The shuttle lever 34 is not variable continuously, but its operation position is switchable between three positions set in advance, i.e., a forward position FF, a neutral position NN, and a reverse position RR. Which one of the three positions the operation position of the shuttle lever 34 is varied to is detected by the volume 34a of the shuttle lever 34. The detection signal indicative of the operation position, detected by the volume 34a, is input into the ECU 35 as a signal indicative of an instructed advancing direction.

The ECU 35 outputs a control signal to the electric motor 4 based on the detection signal from the volume 33a detecting the operation position of the main select lever 33 and the detection signal from the volume 34a detecting the operation position of the main shuttle lever 34, so that a traveling speed on an instructed forward or reverse side is achieved.

The electric motor 4 rotates the trunnion shaft 12b in the forward or reverse direction based on the control signal from the ECU 35 to control the operation of the hydrostatic continuously variable transmission 12 such that driving to the instructed advancing direction is performed at an instructed driving speed.

Figure 3:
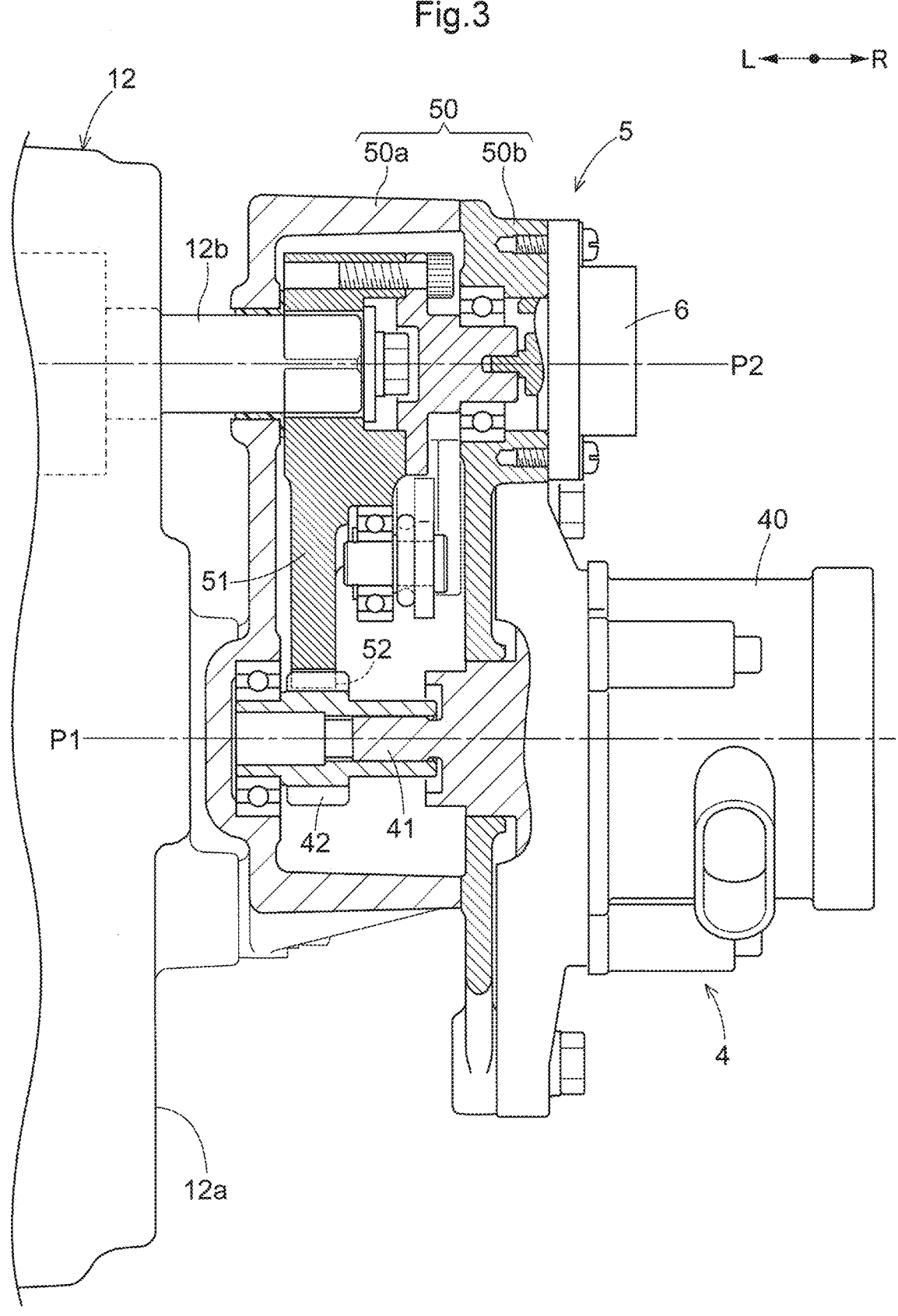
FIG. 3 is a sectional view illustrating an electric motor for operating a trunnion shaft of a hydrostatic continuously variable transmission and a relay operating device.
Figure 4:
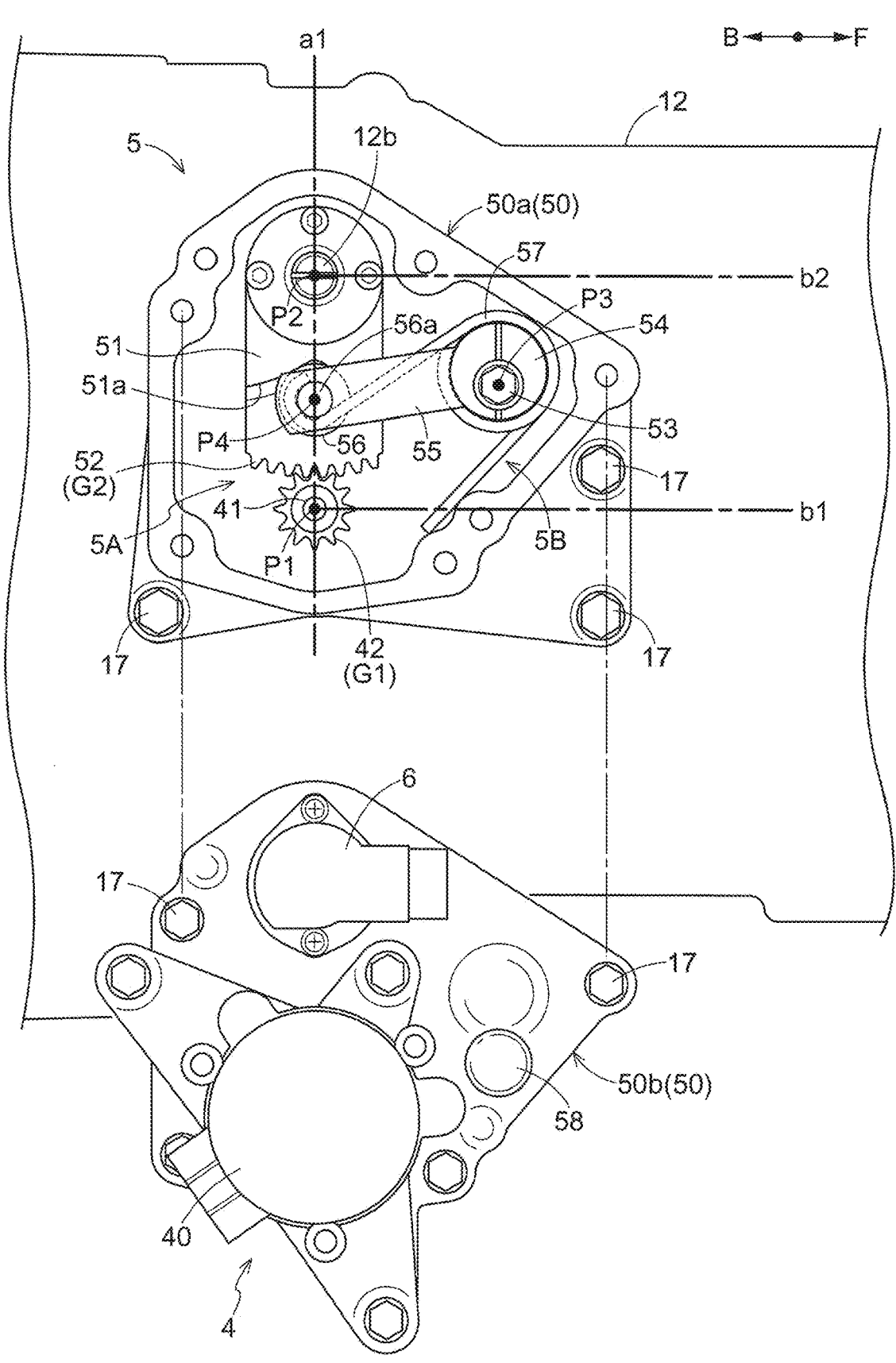
FIG. 4 is an explanatory view illustrating the electric motor for operating the trunnion shaft of the hydrostatic continuously variable transmission and the relay operating device.

As illustrated in FIGS. 1, 3, 4, a relay operating device 5 is attached to the external wall 12a on the right side of the hydrostatic continuously variable transmission 12.

The relay operating device 5 transmits a shifting operation by the electric motor 4 to the hydrostatic continuously variable transmission 12 and is configured as follows.

As illustrated in FIGS. 3, 4, the relay operating device 5 includes a linkage mechanism 5A configured to link a shifting shaft 41 of the electric motor 4 with the trunnion shaft 12b of the hydrostatic continuously variable transmission 12 to transmit the shifting operation of the electric motor 4 to the trunnion shaft 12b, and a biasing mechanism 5B configured to restrain the occurrence of backlash at a meshing portion between a drive gear 42 (corresponding to a first gear) and a driven gear 52 (corresponding to a second gear) provided in the linkage mechanism 5A.

The linkage mechanism 5A and the biasing mechanism 5B are housed in a common casing 50. The casing 50 is removably fixed to the external wall 12a of the hydrostatic continuously variable transmission 12 by use of a fixing tool such as a check bolt 17.

The linkage mechanism 5A includes the drive gear 42 as a first linkage section G1 linked with the shifting shaft 41 defined by an output shaft of the electric motor 4, and the driven gear 52 as a second linkage section G2 linked with the trunnion shaft 12b.

The electric motor 4 includes a motor case 40 housing a rotor or a stator, and the shifting shaft 41 projecting from the motor case 40. The motor case 40 is connected and fixed to the outside of a casing cover 50b (described later) of the casing 50. The shifting shaft 41 projecting from the motor case 40 is provided to penetrate through the casing cover 50b and enter a casing main body 50a of the casing 50.

The drive gear 42 is provided to be outwardly engaged with the shifting shaft 41 to rotate together with an axial center P1 of the shifting shaft 41 in the forward or reverse direction. The driven gear 52 meshing with the drive gear 42 is formed in an end portion of a swing arm 51 configured to swing together with the trunnion shaft 12b. That is, the swing arm 51 is attached to swing together with the trunnion shaft 12b around an axial center P2 of the trunnion shaft 12b. The swing arm 51 has an edge portion at a position away from the axial center P2 of the trunnion shaft 12b which edge portion is provided with a gear having a pitch circle around the axial center P2 of the trunnion shaft 12b, and this gear constitutes the driven gear 52.

The biasing mechanism 5B includes the swing arm 51 swinging together with the trunnion shaft 12b, and an operation body 55 configured to swing around an axial center P3 parallel to the axial center P2 of the trunnion shaft 12b. The swing arm 51 includes a cam 51a to guide a cam follower 56 of the operation body 55. The cam 51a is formed in a portion closer to the axial center P2 of the trunnion shaft 12*b* than a portion where the driven gear 52 is formed in the swing arm 51.

Figure 5:
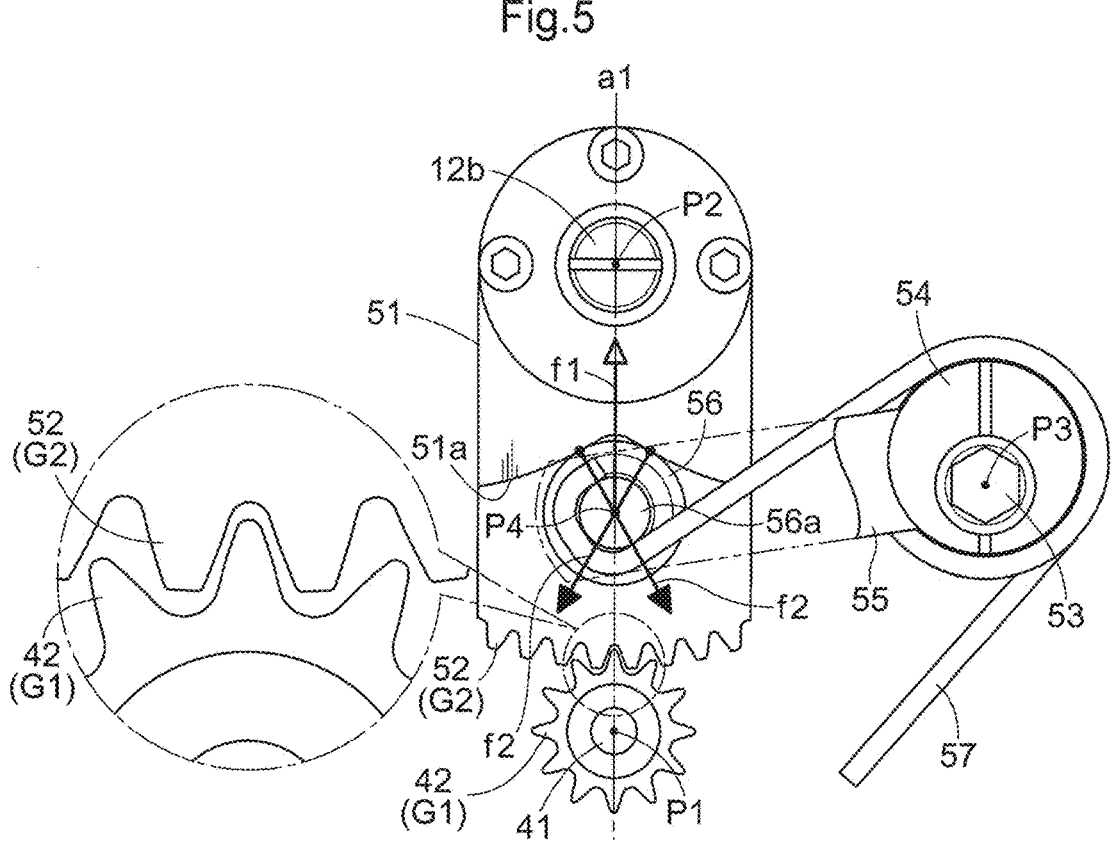
FIG. 5 is a side view illustrating a neutral biasing device with the trunnion shaft being operated to a neutral position.

As illustrated in FIGS. 4 and 5, when the trunnion shaft 12*b* of the hydrostatic continuously variable transmission 12 is located at a neutral position, the cam 51*a* is linearly symmetrical across a virtual line segment a1 connecting the axial center P2 of the trunnion shaft 12*b* to the axial center P1 of the shifting shaft 41.

The swing arm 51 is defined by a single member and includes both the driven gear 52 and the cam 51*a* formed at different positions in the axial-center direction of the trunnion shaft 12*b*. That is, as illustrated in FIGS. 3 and 4, the swing arm 51 is defined by a plate-shaped structure attached to the trunnion shaft 12*b* and extending toward the shifting shaft 41, but the swing arm 51 is a stepped plate structure in which the plate thickness on a side closer to the axial center P2 of the trunnion shaft 12*b* is thicker than the plate thickness on a side farther from the axial center P2.

The cam 51*a* is formed in a stepped portion at a boundary between a thick portion having a large plate thickness on the side closer to the axial center P2 of the trunnion shaft 12*b* and a thin portion having a small plate thickness on the side farther from the axial center P2, and the driven gear 52 is formed in an edge portion of the swing arm 51 at a position farther from the axial center P2 of the trunnion shaft 12*b* than a portion where the cam 51*a* is present.

The operation body 55 is supported on a shaft 53 having the axial center P3 parallel to the axial center P2 of the trunnion shaft 12*b*, and an eccentric portion 54 is formed integrally with the shaft 53.

The operation body 55 includes a biasing spring 57 configured to bias the cam follower 56 toward the cam 51*a*. The biasing spring 57 is a torsion spring and is attached to the shaft 53 such that an intermediate portion of the biasing spring 57 is wound on the eccentric portion 54, with one end portion being wound on a shaft 56*a* of the cam follower 56 and the other end portion abutting with an inner surface of a surrounding wall of the casing 50.

With this configuration, the inner surface of the surrounding wall of the casing 50 receives a reaction force to the other end portion of the biasing spring 57, so that the one end portion of the biasing spring 57 biases the cam follower 56 in a direction to always press the cam follower 56 against the cam 51*a*.

The biasing force of the biasing spring 57 is not a biasing force that forcibly swings the swing arm 51 to return the trunnion shaft 12*b* to its neutral position but is a biasing force that can swing the swing arm 51 just by backlash between the drive gear 42 and the driven gear 52.

As illustrated in FIG. 4, the axial center P3 as a swing fulcrum for the operation body 55 is provided in an interval between a line segment b2 passing through the axial center P2 of the trunnion shaft 12*b* and a line segment b1 passing through the axial center P1 of the shifting shaft 41, in a direction perpendicular to the virtual line segment a1 connecting the axial center P2 of the trunnion shaft 12*b* and the axial center P1 of the shifting shaft 41.

When the eccentric portion 54 formed integrally in the shaft 53 is rotated around the axial center P3, the biasing direction of the biasing spring 57 attached to be wound on the eccentric portion 54 is finely adjusted, so that a corresponding position of the cam follower 56 to the cam 51*a* can be finely adjusted.

As illustrated in FIGS. 3 and 4, the casing 50 housing the linkage mechanism 5A and the biasing mechanism 5B includes the casing main body 50*a* having the surrounding wall, and the casing cover 50*b* in a cover shape covering the open side of the casing main body 50*a*.

As illustrated in FIG. 3, the casing 50 is fixed to the hydrostatic continuously variable transmission 12 with the bottom of the casing main body 50*a* facing the external wall 12*a* of the hydrostatic continuously variable transmission 12. The electric motor 4 is fixed to the casing cover 50*b* and can be attached to and detached from the hydrostatic continuously variable transmission 12 together with the casing 50.

As illustrated in FIGS. 3, 4, the casing cover 50*b* is provided with a volume (variable resistor) for feedback as a sensor 6 to detect the rotated state of the trunnion shaft 12*b*. The sensor 6 detects the rotation angle of the trunnion shaft 12*b* rotated as the swinging angle of the swing arm 51 changes, so that the sensor 6 can detect the swashplate angle of the hydrostatic continuously variable transmission 12 in real time. A detection signal corresponding to the detected rotation angle of the trunnion shaft 12*b* is output to the ECU 35 as feedback information to detect a change in the swashplate angle of the hydrostatic continuously variable transmission 12.

Further, as illustrated in FIG. 4, the casing cover 50*b* partially includes an internal visual inspection section 58 as an opening or a transparent portion through which the inside of the casing 50 is visually observable. The internal visual inspection section 58 is formed at a position near the eccentric portion 54 and can be used usefully at the time when the adjustment state of the eccentric portion 54 is checked from outside.

An operation form of the relay operating device 5 at the time when the shifting operation of the electric motor 4 is transmitted to the trunnion shaft 12*b* will be described based on FIGS. 2, 5 to 7.

In a case where the main select lever 33 is operated to the lowest speed position Ls, or in a case where the shuttle lever 34 is operated to the neutral position NN, the electric motor 4 operates the trunnion shaft 12*b* to a neutral position as illustrated in FIG. 5.

In this state, the acting direction of a biasing force f1 of the biasing spring 57 biasing the cam follower 56 of the relay operating device 5 toward the cam 51*a* faces a side where the axial center P2 of the trunnion shaft 12*b* is present, at a position where the biasing force f1 coincides with the line segment a1 connecting the axial center P2 of the trunnion shaft 12*b* to the axial center P1 of the shifting shaft 41.

At this time, the direction of a reaction force of the cam 51*a* at a position where the cam 51*a* abuts with the cam follower 56 corresponds to directions of reaction forces f2, f2 illustrated in FIG. 5. Respective acting directions of the reaction forces f2, f2 are directed in reverse directions across the line segment a1 and intersect with each other at generally equal angles, so that the swing arm 51 is maintained at the neutral position without swinging clockwise or counterclockwise direction around the axial center P2 of the trunnion shaft 12*b*.

Figure 6:
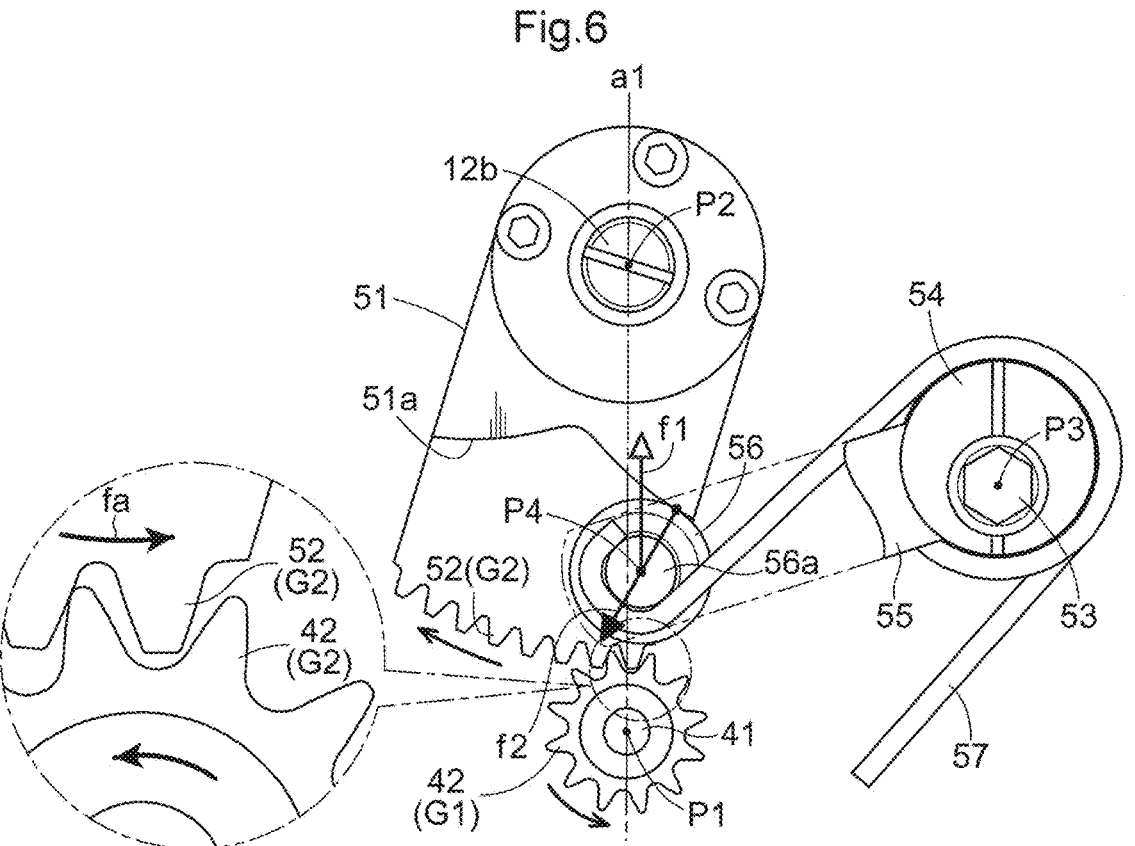
FIG. 6 is a side view illustrating the neutral biasing device with the trunnion shaft being operated to a highest speed position on a forward side.

In a case where the shuttle lever 34 is operated to the forward position FF, and the main select lever 33 is operated to approach the highest speed position Hs from the lowest speed position Ls, the electric motor 4 rotates the drive gear 42 counterclockwise as illustrated in FIG. 6, so that the swing arm 51 swings clockwise. As a result, the trunnion shaft 12*b* also rotates clockwise to change the swashplate angle of the hydrostatic continuously variable transmission 12 by a predetermined amount, so that forward traveling is performed.

At this time, the direction of the reaction force of the cam 51*a* at the position where the cam 51*a* abuts with the cam follower 56 corresponds to a direction of the reaction force f2 illustrated in FIG. 6.

The acting direction of the reaction force f2 faces one side across the line segment a1, i.e., the left side in FIG. 6. At this time, since the distance from the axial center P3 of the operation body 55 to the cam follower 56 is constant, the biasing spring 57 acts to draw the swing arm 51 relatively to the right direction reverse to the direction (the left direction) of the reaction force f2 acting on the cam follower 56, so that the driven gear 52 on the swing arm 51 side approaches a direction fa where the driven gear 52 abuts with the tooth flank of the drive gear 42 as illustrated in an enlarged part in the figure, and hereby, the driven gear 52 is maintained at this position. That is, during forward traveling, the driven gear 52 on the swing arm 51 side is always driven with the driven gear 52 abutting the tooth flank of the drive gear 42 and is driven while backlash hardly occurs.

Figure 7:
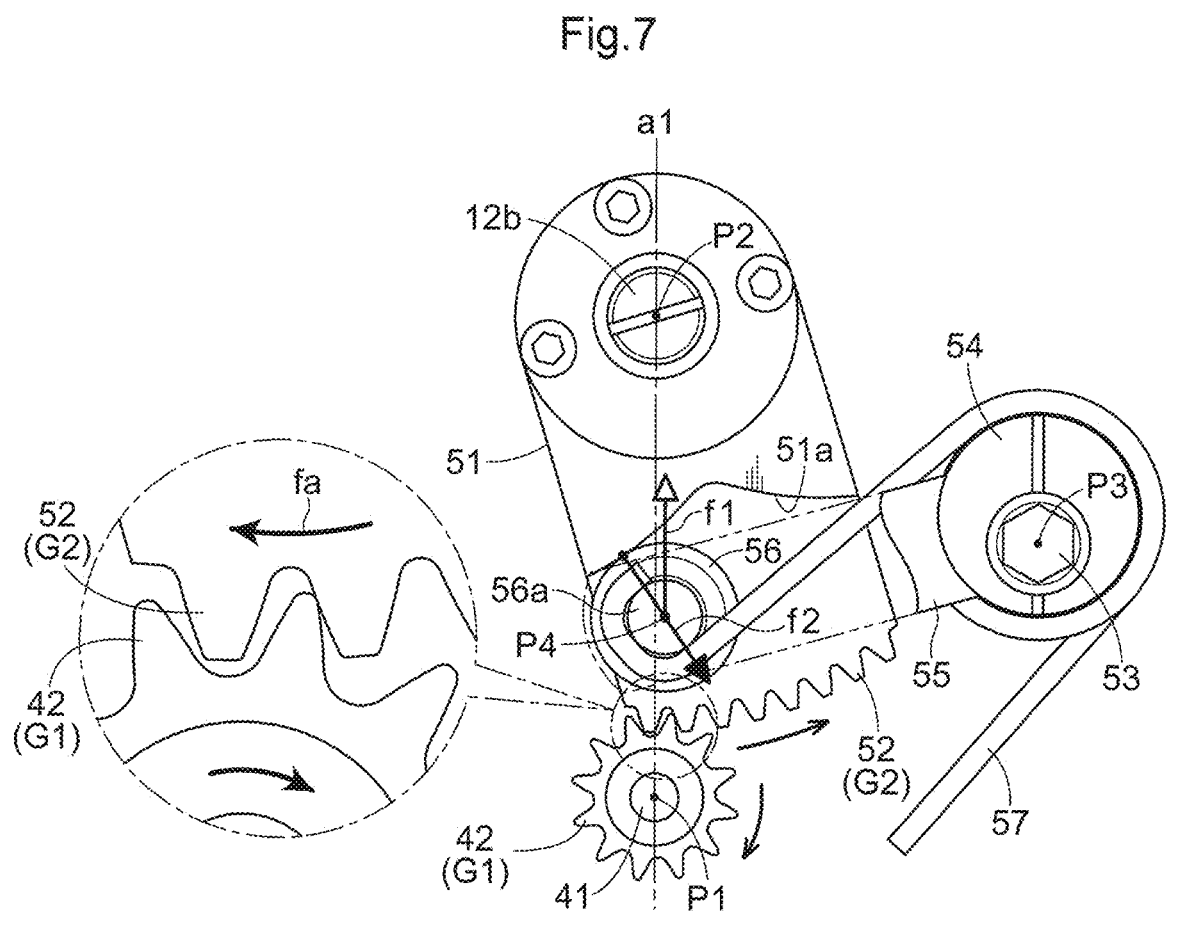

In a case where the shuttle lever 34 is operated to the reverse position RR, and the main select lever 33 is operated to approach the highest speed position Hs from the lowest speed position Ls, the electric motor 4 rotates the drive gear 42 clockwise as illustrated in FIG. 7, so that the swing arm 51 swings counterclockwise. As a result, the trunnion shaft 12*b* also rotates counterclockwise to change the swashplate angle of the hydrostatic continuously variable transmission 12 by a predetermined amount, so that reverse traveling is performed.

At this time, the direction of the reaction force of the cam 51*a* at the position where the cam 51*a* abuts with the cam follower 56 corresponds to a direction of the reaction force f2 illustrated in FIG. 7.

The acting direction of the reaction force f2 faces one side across the line segment a1, i.e., the right side in FIG. 7. At this time, since the distance from the axial center P3 of the operation body 55 to the cam follower 56 is constant, the biasing spring 7 acts to press the swing arm 51 relatively to the left direction reverse to the direction (the right direction) of the reaction force f2 acting on the cam follower 56, so that the driven gear 52 on the swing arm 51 side approaches a direction fa where the driven gear 52 abuts with the tooth flank of the drive gear 42 as illustrated in an enlarged portion in the figure, and hereby, the driven gear 52 is maintained at this position. That is, during reverse traveling, the driven gear 52 on the swing arm 51 side is always driven with the driven gear 52 abutting the tooth flank of the drive gear 42 and is driven while backlash hardly occurs.

ALTERNATIVE EXAMPLE EMBODIMENTS

Alternative example embodiments will be described below. Some of the following alternative example embodiments may be used in combination as long as no inconsistency occurs. Note that the scope of the present invention is not limited to those example embodiments.

(1) The above example embodiment describes, as an example, the configuration in which the first linkage section G1 linked with the shifting shaft 41 includes a single drive gear 42, and the second linkage section G2 linked with the trunnion shaft 12*b* includes a single driven gear 52, but example embodiments of the present invention are not necessarily limited to this configuration.

For example, the first linkage section G1 may include a plurality of gears, the second linkage section G2 may include a plurality of gears, or the first linkage section G1 and the second linkage section G2 may both include a plurality of gears.

As the other configuration, a configuration similar to that in the above example embodiment may be used.

(2) The above example embodiment describes, as an example, the configuration in which the swing arm 51 configured to swing together with the trunnion shaft 12*b* includes the cam 51*a*, and the operation body 55 includes the cam follower 56, but example embodiments of the present invention are not necessarily limited to this configuration. For example, the swing arm 51 may include the cam follower 56, and the operation body 55 may include the cam 51*a*.

As the other configuration, a configuration similar to that in the above example embodiment may be used.

(3) The above example embodiment describes, as an example, the configuration in which the swing arm 51 swinging together with the trunnion shaft 12*b* includes the driven gear 52 and the cam 51*a*, but example embodiments of the present invention are not necessarily limited to this configuration. For example, an appropriate configuration such as a configuration in which the driven gear 52 and the swing arm 51 are attached to different members, or a configuration in which the driven gear 52 is directly attached to the trunnion shaft 12*b*, and the cam 51*a* is formed in the swing arm 51 provided separately from this can be used.

As the other configuration, a configuration similar to that in the above example embodiment may be used.

(4) The above example embodiment describes, as an example, the configuration in which the axial center P3 as the swing fulcrum for the operation body 55 is provided in the interval between the line segment b2 passing through the axial center P2 of the trunnion shaft 12*b* and the line segment b1 passing through the axial center P1 of the shifting shaft 41, in the direction perpendicular to the virtual line segment a1 connecting the trunnion shaft 12*b* and the shifting shaft 41, but example embodiments of the present invention are not necessarily limited to this configuration. For example, the axial center P3 as the swing fulcrum for the operation body 55 may be provided at a position deviating from the interval between the line segment b2 and the line segment b1.

As the other configuration, a configuration similar to that in the above example embodiment may be used.

(5) The above example embodiment describes, as an example, the configuration in which the biasing mechanism 5B is housed in the casing 50, and the electric motor 4 is supported on the casing 50, but example embodiments of the present invention are not necessarily limited to this configuration. For example, the casing 50 housing the biasing mechanism 5B may not be provided, and the biasing mechanism 5B and the electric motor 4 may be stored in an internal space of the vehicle body appropriately.

As the other configuration, a configuration similar to that in the above example embodiment may be used.

(6) The above example embodiment describes, as an example, the configuration in which the casing 50 of the relay operating device 5 is attached to the external wall 12*a* of the hydrostatic continuously variable transmission 12 and the sensor 6 to detect the swashplate angle of the hydrostatic continuously variable transmission 12 is supported by the casing 50, but example embodiments of the present invention are not necessarily limited to this configuration. For example, the casing 50 of the relay operating device 5 may be attached to a portion other than the external wall 12*a* of the hydrostatic continuously variable transmission 12. In this case, the sensor 6 may detect the swashplate angle of the hydrostatic continuously variable transmission 12 by supporting the sensor 6 on the external wall 12*a* of the hydrostatic continuously variable transmission 12 such that the sensor 6 can detect the rotation angle of the trunnion shaft 12*b* at a position different from the casing 50.

As the other configuration, a configuration similar to that in the above example embodiment may be used.

(7) The above example embodiment describes, as an example, the configuration in which the biasing spring 57 is a torsion spring housed in the casing 50, but the biasing spring 57 is not limited to a torsion spring, and an appropriate spring such as a coiled spring may be used as the biasing spring 57.

As the other configuration, a configuration similar to that in the above example embodiment may be used.

(8) The above example embodiment describes, as an example, the configuration in which the pump of the hydrostatic continuously variable transmission 12 is a main transmission mechanism for a tractor, but example embodiments of the present invention are not necessarily limited to this configuration. For example, the pump of the hydrostatic continuously variable transmission 12 may be a transmission mechanism other than the main transmission mechanism for the tractor.

Further, the motor of the hydrostatic continuously variable transmission 12 may be used as a secondary transmission mechanism for the tractor.

As the other configuration, a configuration similar to that in the above example embodiment may be used.

Example embodiments of the present invention can be applied to various work vehicles such as a combine, a rice transplanter, and a hauling vehicle as well as the tractor as a work vehicle including a neutral operating device in an operation system from an electric motor to a hydrostatic continuously variable transmission.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle, comprising:
a hydrostatic continuously variable transmission to output power;
an electric motor to perform shifting;
a linkage mechanism to link a shifting shaft of the electric motor with a trunnion shaft of the hydrostatic continuously variable transmission, the linkage mechanism including a first linkage section linked with the shifting shaft, and a second linkage section linked with the trunnion shaft; and
a biasing mechanism to press and bias a second gear of the second linkage section, which meshes with a first gear of the first linkage section, against the first gear such that a tooth flank of the second gear abuts with a tooth flank of the first gear in a rotation direction reverse to a rotation direction of the first gear; wherein
the biasing mechanism includes:

a swing arm swingable together with the trunnion shaft; and
an operation body swingable around an axial center parallel or substantially parallel to an axial center of the trunnion shaft;
the swing arm includes a cam;
the operation body includes a cam follower;
the biasing mechanism further includes a biasing spring to bias the cam follower toward the cam; and
the swing arm is swingable in a swinging direction causing the tooth flank of the second gear to approach the tooth flank of the first gear, in response to the biasing spring and the cam follower pressing the cam.

2. The work vehicle according to claim 1, wherein the second gear and the cam are provided in the swing arm, at different positions in an axial-center direction of the trunnion shaft.

3. The work vehicle according to claim 1, wherein the operation body includes a swing fulcrum in an interval between a line segment passing through the axial center of the trunnion shaft and a line segment passing through an axial center of the shifting shaft in a direction perpendicular to a virtual line segment connecting the trunnion shaft to the shifting shaft.

4. The work vehicle according to claim 1, wherein the hydrostatic continuously variable transmission includes an external wall to which a casing housing the linkage mechanism and the biasing mechanism is attached.

5. The work vehicle according to claim 4, wherein the electric motor is supported on an outer portion of the casing.

6. The work vehicle according to claim 4, further comprising a sensor supported on the casing to detect a swashplate angle of the hydrostatic continuously variable transmission.

7. The work vehicle according to claim 1, wherein
the hydrostatic continuously variable transmission includes a pump as a main transmission mechanism for a tractor; and
the trunnion shaft is operable to change a swashplate angle of the pump.

8. The work vehicle according to claim 7, wherein the hydrostatic continuously variable transmission includes a motor as a secondary transmission mechanism for the tractor.

9. A work vehicle, comprising:
a hydrostatic continuously variable transmission to output power;
an electric motor to perform shifting;
a linkage mechanism to link a shifting shaft of the electric motor with a trunnion shaft of the hydrostatic continuously variable transmission, the linkage mechanism including a first linkage section linked with the shifting shaft, and a second linkage section linked with the trunnion shaft; and
a biasing mechanism to press and bias a second gear of the second linkage section, which meshes with a first gear of the first linkage section, against the first gear such that a tooth flank of the second gear abuts with a tooth flank of the first gear in a rotation direction reverse to a rotation direction of the first gear; wherein
the hydrostatic continuously variable transmission includes an external wall to which a casing housing the linkage mechanism and the biasing mechanism is attached;
the biasing mechanism includes:

an operation body swingable around an axial center parallel or substantially parallel to an axial center of the trunnion shaft; and a biasing spring to bias a cam follower of the operation body toward a cam of a swing arm swingable together with the trunnion shaft; and the biasing spring is a torsion spring wound on a shaft supporting the operation body and housed in the casing.

10. The work vehicle according to claim 9, wherein the torsion spring includes an end portion supported on the casing to receive a reaction force acting on the cam follower.

\*  \*  \*  \*  \*